United States Patent Office 3,726,888
Patented Apr. 10, 1973

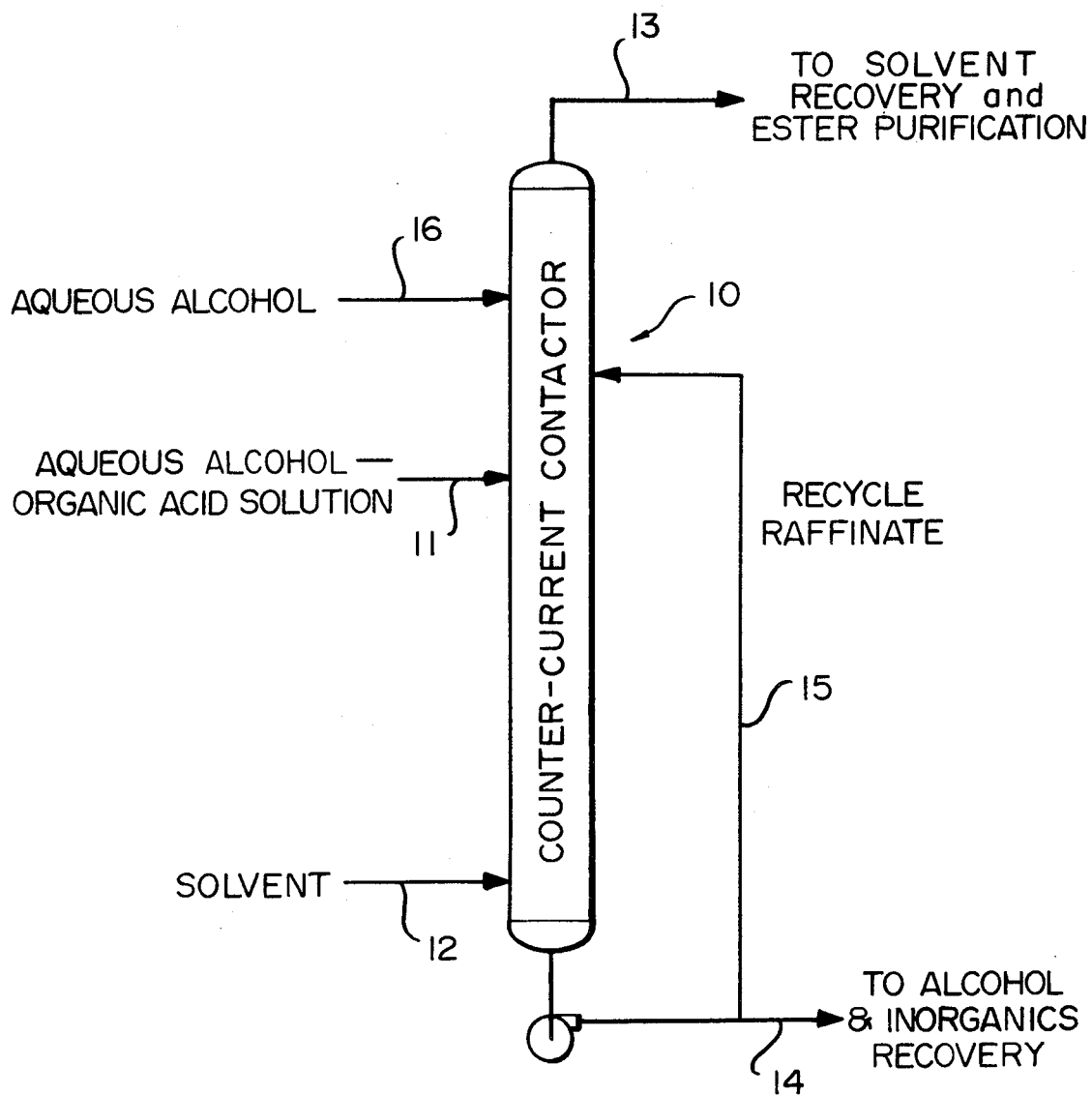

3,726,888
ESTERIFICATION AND EXTRACTION PROCESS
Jimmy L. Hatten, Kurt R. Nauck, Jr., and Samuel S. Mims, Odessa, Tex., assignors to El Paso Products Company, Odessa, Tex.
Filed Mar. 8, 1971, Ser. No. 121,705
Int. Cl. C07c 69/44
U.S. Cl. 260—485 S                                11 Claims

ABSTRACT OF THE DISCLOSURE

There is disclosed an improvement in the process for the recovery of organic acids from mixtures thereof contained in dilute aqueous solutions whereby the acids are esterified with an alcohol or alkylene glycol and extracted with a water-immiscible solvent whereby an organic phase and a spent aqueous phase are formed, the improvement in further contacting the resulting organic phase with a portion of the spent aqueous phase followed by washing with an aqueous alcoholic solution, which procedures minimize excessive fouling in heat exchangers used to supply heat for solvent recovery and also minimize the quantity of half esters formed in the organic phase.

REFERENCES RELATED TO APPLICATION

This application is related to copending application Ser. No. 766,476, filed Oct. 10, 1968 and Ser. No. 851,455, filed Aug. 19, 1969, both by Samuel S. Mims, the disclosures of which are specifically incorporated herein by reference.

BACKGROUND OF THE INVENTION

Field of the invention

This invention relates to an improved process in the esterification and extraction procedure for recovering carboxylic acids contained as mixtures thereof in dilute aqueous solutions whereby excessive fouling of heat exchangers used to supply heat for solvent recovery and purification of the esters is retarded and the formation of half esters is minimized.

DESCRIPTION OF THE PRIOR ART

In U.S. application Ser. No. 766,476, filed Oct. 10, 1968, and Ser. No. 851,445, filed Aug. 19, 1969, of Samuel S. Mims, there are disclosed processes for the recovery of organic acids contained as difficultly separable mixtures in dilute aqueous solutions by an esterification/extraction process. As disclosed in Ser. No. 851,445 this process is of broad application in that it permits the recovery and isolation of difficultly separable organic acids which are contained in a dilute aqueous solution. A common feedstock of this type is the aqueous solution recovered as a waste stream in the production of adipic acid by the nitric acid oxidation of cyclohexanol and cyclohexanone by procedures well known to the prior art, such as described for example in U.S. Pats. 2,557,281; 2,439,513; 2,719,566; 2,840,607; 3,338,959 and 2,971,010. Prior to the developments described in the above-mentioned patent applications, this waste stream was generally considered as waste and the valuable components contained therein were lost, the stream containing a mixture of adipic acid, glutaric acid and succinic acid, catalyst components such as vanadium and copper, spent nitric acid, water and smaller amounts of other components. In accordance with the processes of the above applications, this aqueous waste stream is contacted with a water-miscible alcohol such as methanol to form esters of the acids contained therein and these esters are then extracted by contacting with a water-immisicible solvent, such as benzene. The contact with the methanol and benzene is preferably carried out in a countercurrent manner. From this reaction there is formed an organic phase containing the esters which are formed and an aqueous phase which contains the catalyst components, excess alcohol, nitric acid and the like. In the preferred procedures for conducting this process, the esterification and extraction procedures are conducted simultaneously and preferably in a countercurrent reactor which operates to provide excellent results.

After the organic phase and aqueous phase are separated in this process, the aqueous phase is usually distilled to remove the excess alcohol for reuse and water to provide a resulting mixture concentrated in catalytic components and nitric acid which can be recycled to the adipic acid plant. On the other hand, the organic phase containing the water-immiscible solvent or extractant, and the esters formed, is generally distilled to recover each of these components. The recovered and water-immiscible solvent can then be reused in the process. Also, if desired, the esters formed can be hydrolyzed back to the acids after the separation is complete.

In utilizing this process in practice, however, problems have been experienced with excessive fouling in heat exchangers used to supply heat for the recovery of the solvent and purification of the esters contained in the organic phase resulting from the reaction/extraction operation. Also, it has been found preferable to minimize the presence of half esters or monoesters in this organic phase since they are relatively non-volatile and must be purged from the system as distillation bottoms. The process of the present application provides procedures which improve on the above-described esterification/extraction process and overcome the above disadvantages.

SUMMARY OF THE INVENTION

It is accordingly one object of the present invention to provide an improved process for the recovery of mixtures of organic acids contained in dilute aqueous solutions.

A further object of the invention is to provide a method for use in the esterification and extraction of mixtures of organic acids contained in dilute aqueous solutions which serves to reduce excessive fouling of heat exchange equipment and also reduces the quantity of half esters formed in the esterification procedure.

Other objects and advantages of the present invention will become apparent as the description thereof proceeds.

In satisfaction of the foregoing objects and advantages the process of the present invention provides an improvement in the esterification/extraction process described.

Thus, in the process for the recovery and separation of difficultly separable mixtures of organic acids contained in dilute aqueous solutions wherein the acids are esterified with an alcohol and extracted with a water-immiscible solvent to produce an organic phase and an aqueous phase, there are included the steps of contacting the resulting organic phase with a portion of the spent aqueous phase and washing with an aqueous alcoholic solution, as it has been found that these procedures, which may be carried out in a continuous manner and integrated into the entire process, serve to reduce excessive fouling of heat exchangers and reduce the quantity of half esters in the final mixture.

BRIEF DESCRIPTION OF THE DRAWING

Reference is now made to the drawing accompanying the application where there is illustrated a schematic process for carrying out the process of the invention.

DESCRIPTION OF PREFERRED EMBODIMENTS

As mentioned, the process of this invention relates to an improvement in the procedure for recovering organic acids from dilute aqueous solutions containing mixtures thereof as described above.

Briefly, the process to which this invention is applicable entails the addition of a substantially water-miscible alcohol to one or a mixture of organic carboxylic acids contained in the aqueous solution. The solution is contacted with a suitable substantially water-immiscible solvent, preferably simultaneously with the esterification step, so that a combination reaction and extraction takes place and, surprisingly, nearly complete removal of the esterified acids from the aqueous phase into the nonaqueous phase is easily effected. The acids are in the form of their ester derivatives in the nonaqueous, or organic phase. This nonaqueous phase can then be distilled or otherwise processed to recover the solvent and the remaining ester or mixture thereof processed further by one ore more of several suitable techniques such as fractional distillation, transesterification, crystallization or hydrolysis to yield useful products. The aqueous phase may be processed as desired, but is preferably distilled to recover the excess alcohol and water.

In conducting processes utilizing this technique, problems have been incurred with excessive fouling in the heat exchangers which are used to supply heat to the system for extraction solvent recovery and purification of the esters contained in the organic phase. The invention provides procedures by which these problems are overcome and by which there is effected a reduction in the amount of mono- or half-esters contained in the organic phase.

According to this invention, it has been found that fouling of the heat exchangers can be practically eliminated by initially treating the extract or organic phase with a portion of the raffinate, that is, the separated or spent aqueous phase, followed by a second washing of the extract or organic phase with an aqueous alcoholic solution such as a methanolic solution. The combined aqueous phase from these treatments may then be recycled in the reaction/extraction operation. These additional measures also effectively prevent the formation of deposits on downstream heat exchange equipment.

This system is especially advantageous when operating with a continuous recovery system utilizing a countercurrent reactor or contactor. In this system the organic acid containing aqueous solution is contacted with the chosen alcohol and this mixture is passed countercurrently through the extracting solvent. In the procedure as previously carried out for this process, the resulting mixture was allowed to settle for formation of the organic phase and aqueous phase and then later processed as described above. According to the present process, however, the mixture is contacted with a portion of the recycle raffinate (aqueous phase) and aqueous alcoholic solution prior to distillation for solvent recovery and ester purification.

Any quantity of spent aqueous phase or raffinate may be employed in the additional washing operations. However, large excesses have been found to lower the efficiency of the reaction/extraction step and very small quantities do not adequately reduce the fouling of the heat exchangers. Thus, it has been found that about 5 to 20 parts of recycle raffinate or aqueous phase per 100 parts of feedstock are desirable ranges for purposes of the invention. The contacting step is conducted at a temperature of about 20 to 80° C., preferably, however, at room temperature.

A secondary benefit of this treatment resides in achieving a reduction in the quantity of half esters contained in the organic phase from the reaction/extraction operation. These half esters are relatively nonvolatile and must be purged from the purification train as distillation bottoms. Thus, this treatment decreases this volume of this waste stream.

In the second step of the process, the alcohol which may be employed for the alcoholic washing step may be any of the lower alkyl alcohols or lower alkylene glycols containing 1 to about 7 carbon atoms. However, a highly preferred alcohol is methanol because of its ready availability and the good results obtained. The alcohol is preferably maintained as about a 5 to 30% aqueous solution. The amount of solution used in this step should run about 5 to 30 parts per 100 parts of feedstock to be treated. This washing step is preferably carried out at a temperature of about 20 to 80° C. and most preferably at room temperature.

Referring now specifically to the drawing accompanying this application which illustrates one procedure for practicing the process of this invention, it will be seen that a countercurrent reactor or contactor 10 is provided in which the extraction and esterification are conducted in a continuous manner. In this reactor the aqueous solution containing the mixture of organic acids and already admixed with the alcohol by which the esters are formed is introduced by line 11 into the countercurrent contactor 10. Simultaneously, to effect a countercurrent operation, the extracting solvent is introduced into the other end of the reactor at line 12. The resulting organic phase is recovered and removed through line 13 and the aqueous phase is removed for recovery through line 14. This is the general procedure as described in the above-mentioned applications. According to this invention the mixture within the countercurrent contactor is further reacted with a portion of the recycle aqueous phase, this portion being taken off line 14 by line 15 and inroduced through line 15 into the contactor 10. In the meantime the aqueous alcoholic soluiton is introduced through line 16 into reactor 10. Thus, the procedures of this invention may be utilized in a continuous manner to provide the advantageous results of the present invention.

The process of the invention is specifically described and illustrated herein with respect to operation with a waste stream from an adipic acid plant. However, it is to be understood that the procedure of this invention is equally useful with any of the processes disclosed in copending Ser. No. 851,445, the disclosure of which is incorporated herein by reference.

The following examples are presented to illustrate the invention, but it is not to be considered as limited thereto. In the following examples parts are by weight unless otherwise designated.

EXAMPLE 1

A nitric acid oxidation purge stream containing 5.2% succinic acid, 10.6% glutaric acid, 2.6% adipic acid, 9.5% $HNO_3$ and some metal salts was fed to a reactor-extractor system at a rate of 25 pounds per hour combined with 10 pounds per hour of methanol. The extractor column was 4 inches in diameter and 15 feet long and was packed with ¼ inch Intalox. Benzene was added to the bottom of the column at a rate of 25 pounds per hour. Water was added above the aqueous phase feed point at a rate of 5 pounds per hour. The organic phase removed was distilled to recover benzene and methyl esters. The organic phase was concentrated to recover the metal salts and $HNO_3$. Operating under these conditions for a period of one week resulted in severe fouling of the heat exchange equipment used for benzene recovery and ester purification of the organic phase.

EXAMPLE 2

The extractor-reactor system shown in the drawing was operated at the same conditions as Example 1, except that wash water added to the top of the column was replaced with the same rate of 20% aqueous methanol and 5 pounds per hour of raffinate wash aqueous phase recycled back to a point in the column above the aqueous phase feed point but below the wash water injection. This arrangement resulted in a relatively insignificant fouling rate.

EXAMPLE 3

The benzene phase obtained by application of the reaction-extraction process to the purge stream from a commercial adipic acid plant had the composition given in the first column of the following table. Eleven parts of this organic phase were treated at ambient temperature with one part by weight of the aqueous streams indicated in the second and third columns of the table. These treatments were done in a packed, countercurrent column 45 mm. in diameter and 700 mm. in height. The column was packed with 7 mm. diameter x 7 mm. ceramic cylinders. The column was operated with the aqueous phase as the continuous phase and with a 30-minute holdup time for this aqueous phase. The results are summarized in the table.

COMPOSITION OF UNTREATED AND TREATED EXTRACT

|  | Untreated | Treated with 40% aqueous methanol | Treated with extractor raffinate |
|---|---|---|---|
| Dimethyl: | | | |
| Succinate, weight percent | 4.0 | 3.9 | 3.9 |
| Glutarate, weight percent | 8.6 | 8.5 | 8.4 |
| Adipate, weight percent | 2.1 | 2.1 | 2.3 |
| Monomethyl: | | | |
| Succinate, weight percent | 0.2 | 0.1 | Trace |
| Glutarate, weight percent | 0.4 | 0.2 | 0.1 |
| Adipate, weight percent | 0.2 | 0.1 | Trace |

From the above table, the significant reduction in monomethyl esters is apparent using either the aqueous methanol wash or the raffinate wash.

The invention has been described herein with reference to certain preferred embodiments. However, as obvious variations thereon will become apparent to those skilled in the art, the invention is not to be considered as limited thereto.

What is claimed is:

1. In the process for the separation and recovery of components contained in a waste stream from an adipic acid plant, said waste stream comprising a mixture of adipic acid, glutaric acid, succinic acid, metal catalyst values and nitric acid, wherein at least one of said acids is esterified by contact with a lower alkyl alcohol, lower alkylene glycol or mixture thereof and extracted with a water-immiscible organic solvent to form an organic phase containing the esters formed, and an aqueous phase, and separating said organic phase and said aqueous phase, the steps including further contacting said organic phase with about 5 to 20 parts of said aqueous phase per 100 parts of said organic phase and then contacting said organic phase with about 5 to 30 parts of an aqueous alcoholic solution per 100 parts of said organic phase, said aqueous alcoholic solution being about a 5 to 30 percent aqueous solution of a lower alkyl alcohol, lower alkylene glycol or mixture thereof.

2. A process according to claim 1 wherein said reactions are carried out at temperatures from about 20–80° C.

3. A process according to claim 2 wherein said organic phase is subsequently distilled and the water-immiscible organic solvent is recovered.

4. A process according to claim 3 wherein the esterification alcohol is methanol and said water-immiscible organic solvent is benzene.

5. A process according to claim 4 wherein said aqueous alcoholic solution is 5 to 30 weight percent of an aqueous solution of methanol.

6. In a continuous process for the separation and recovery of components contained in a waste stream from an adipic acid plant, said waste stream comprising an aqueous solution of adipic acid, glutaric acid, succinic acid, metal catalyst values and nitric acid, wherein at least one of said acids is esterified with a lower alkyl alcohol, lower alkylene glycol or mixture thereof and extracted with a water-immiscible organic solvent to form an organic phase containing the esters formed, and an aqueous phase, and separating said organic phase and said aqueous phase; the steps including continuously contacting said organic phase with about 5 to 20 parts of said aqueous phase per 100 parts of said organic phase, and then contacting said organic phase with about 5 to 30 parts of an aqueous alcoholic solution per 100 parts of said organic phase wherein said aqueous alcoholic solution is about 5 to 30 percent aqueous solution of a lower alkyl alcohol, lower alkylene glycol or mixture thereof.

7. A process according to claim 6 wherein said organic phase is subsequently distilled and the water-immiscible organic solvent is recycled for further extraction.

8. A process according to claim 7 wherein said reactions are carried out at temperatures of about 20 to 80° C.

9. A process according to claim 8 wherein the esterification alcohol is methanol and the water-immiscible organic solvent is benzene.

10. A process according to claim 9 wherein said aqueous alcoholic solution is a 5 to 30 percent aqueous solution of methanol.

11. A process according to claim 10 wherein said reactions are carried out by countercurrent contact of the reactants.

References Cited

C & E News, p. 50, July 20, 1970.
Perry's Chem. Engineer's Handbook, section 14, pp. 42 and 43 (1963).

HENRY R. JILES, Primary Examiner

E. J. SKELLY, Assistant Examiner

U.S. Cl. X.R.

260—485 G, 531 R, 537 P

UNITED STATES PATENT OFFICE
CERTIFICATE OF CORRECTION

Patent No. 3,726,888                     Dated April 10, 1973

Inventor(s) Jimmy L. Hatten et al

It is certified that error appears in the above-identified patent and that said Letters Patent are hereby corrected as shown below:

Column 1, line 28 - Serial Number "851,455" should be
-- 851,445 --.

Signed and sealed this 12th day of February 1974.

(SEAL)
Attest:

EDWARD M. FLETCHER, JR.                  C. MARSHALL DANN
Attesting Officer                        Commissioner of Patents